(12) United States Patent
Grau et al.

(10) Patent No.: US 8,690,174 B2
(45) Date of Patent: Apr. 8, 2014

(54) GEARED MOTOR FOR AN ACTIVE ROLL STABILIZER

(75) Inventors: Ulrich Grau, Emskirchen (DE); Ralf Mayer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 519 days.

(21) Appl. No.: 12/694,621

(22) Filed: Jan. 27, 2010

(65) Prior Publication Data

US 2010/0187778 A1 Jul. 29, 2010

(30) Foreign Application Priority Data

Jan. 28, 2009 (DE) .......................... 10 2009 006 385

(51) Int. Cl.
*B60G 21/055* (2006.01)
*F16D 3/10* (2006.01)

(52) U.S. Cl.
CPC .................................. *B60G 21/0555* (2013.01)
USPC .......... 280/124.107; 280/124.103; 280/5.509; 464/51; 464/81

(58) Field of Classification Search
CPC ..................... B60G 2800/0122; B60G 21/055
USPC ................. 280/5.508, 124.106, 5.507, 5.509, 280/124.103, 124.107; 464/51, 52, 69, 73, 464/81, 87
See application file for complete search history.

(56) References Cited

U.S. PATENT DOCUMENTS

| 3,084,004 | A | * | 4/1963 | Henley .......................... 384/448 |
| 4,530,609 | A | * | 7/1985 | Jasperse et al. ................ 384/482 |
| 6,022,030 | A | * | 2/2000 | Fehring ....................... 280/5.511 |
| 6,805,361 | B2 | * | 10/2004 | Germano et al. ........... 280/5.511 |
| 6,880,451 | B2 | * | 4/2005 | Beilner et al. .................. 92/121 |
| 6,948,707 | B2 | * | 9/2005 | Gradu ........................... 267/191 |
| 7,121,559 | B2 | * | 10/2006 | Ersoy et al. ................. 280/5.511 |
| 7,309,074 | B2 | * | 12/2007 | Taneda ................... 280/124.107 |
| 7,815,205 | B2 | * | 10/2010 | Barth et al. ............ 280/124.107 |
| 7,819,406 | B2 | * | 10/2010 | Beetz et al. ................. 280/5.511 |
| 7,871,092 | B2 | * | 1/2011 | Renard et al. .......... 280/124.166 |
| 2004/0217569 | A1 | * | 11/2004 | Gradu et al. ........... 280/124.107 |
| 2005/0236793 | A1 | * | 10/2005 | Taneda et al. .......... 280/124.107 |
| 2006/0017251 | A1 | * | 1/2006 | Taneda ................... 280/124.106 |
| 2006/0273539 | A1 | * | 12/2006 | Barth et al. ............ 280/124.107 |
| 2008/0191430 | A1 | * | 8/2008 | Grannemann et al. ..... 280/5.511 |
| 2010/0072725 | A1 | * | 3/2010 | Woellhaf et al. ........ 280/124.107 |
| 2010/0187778 | A1 | * | 7/2010 | Grau et al. ................. 280/5.508 |
| 2010/0207343 | A1 | * | 8/2010 | Sano ........................ 280/124.106 |
| 2010/0327549 | A1 | * | 12/2010 | Barth et al. ............ 280/124.106 |
| 2011/0037239 | A1 | * | 2/2011 | Mori et al. ............. 280/124.106 |
| 2011/0140378 | A1 | * | 6/2011 | Grau et al. ................. 280/5.508 |

FOREIGN PATENT DOCUMENTS

| DE | 101 48 095 A1 | | 4/2003 |
| DE | 10 2005 031 414 A1 | | 1/2007 |
| DE | 102005031414 A1 | * | 1/2007 |
| EP | 1 627 757 A1 | | 2/2006 |
| EP | 1 785 294 A1 | | 5/2007 |
| EP | 2 011 674 A1 | | 1/2009 |
| FR | 2 751 803 A1 | | 1/1998 |
| FR | 2 874 860 A1 | | 3/2006 |

* cited by examiner

*Primary Examiner* — Karen Beck
(74) *Attorney, Agent, or Firm* — Lucas & Mercanti, LLP

(57) ABSTRACT

A slewing motor for an active roll stabilizer, which can be connected by its drive to one stabilizer half, and which can be connected on the stator side to another stabilizer half of a divided stabilizer. A torsion element, whose rotational rigidity is lower than the rotational rigidity of the stabilizer, is effectively arranged between the drive and the one stabilizer half.

11 Claims, 3 Drawing Sheets

GEARED MOTOR FOR AN ACTIVE ROLL STABILIZER

This application claims the priority of DE 10 2009 006 385.4 filed Jan. 28, 2009, which is incorporated by reference herein.

BACKGROUND OF THE INVENTION

The present invention relates to a slewing motor for an active roll stabilizer such as is used in modern motor vehicles for avoiding rolling movements of the vehicle body. The slewing motor is used here selectively to build up and reduce forces which counteract the rolling.

DE 10 2005 031 414 A1 has disclosed, for example, a slewing motor for compensating for vehicle movements, wherein this slewing motor is arranged in a stabilizer and is connected to the two ends (facing one another) of a first stabilizer half and of a second stabilizer half.

In particular in the case of straight-ahead travel and one-sided springing movement, for example when traveling on uneven roadways, faulty behavior of such active roll stabilizers can have disadvantageous effects. The cause of this faulty behavior is the relative rotation between the two stabilizer halves at low torques and high frequencies which are transmitted to the slewing motor.

SUMMARY OF THE INVENTION

The object of the present invention is to specify a slewing motor in which a faulty behavior of the active roll stabilizer is significantly reduced.

According to the invention, a torsion element, whose rotational rigidity is lower than the rotation rigidity of the stabilizer, is effectively arranged between the drive and the one stabilizer half ensures that small relative rotations between the two stabilizer halves are permitted without appreciable movements occurring in the slewing motor between drive and housing or stator. According to the invention, the rigid connection, provided in the prior art, between the stabilizer half and the drive of the slewing motor is interrupted by the torsion element according to the invention. According to the invention, a rigidity step is provided between the two stabilizer halves, with the result that, between the two stabilizer halves with comparatively high rigidity values, an element with a relatively low rotational rigidity value permits rotations between the two stabilizer halves without appreciable rotation at the intermediately connected slewing motor.

On the stator side, the slewing motor can be connected to the one stabilizer half. On the stator side, a housing may be provided in which the rotor is rotatably mounted. This housing may be connected to the one stabilizer half. The two stabilizer halves may be embodied with equal lengths but also with different lengths.

If a predefined rotational angle of the two stabilizer halves is exceeded, it is possible, in one development according to the invention, for the force flux or torque flux between the two stabilizer halves to be transmitted via the slewing motor without further loading of the intermediately connected torsion element occurring.

However, according to the invention it is also possible for the torsion element to be configured in such a way that the loading can be conducted via the torsion element over the entire rotational angle and loading range of the stabilizer. In this case, the torsion element is provided with a progressive rotational rigidity characteristic curve, with the result that starting from a predetermined rotational angle, the torsion element is more rigid than the connected stabilizer halves.

The torsion element is preferably accommodated inside a motor housing of the slewing motor. In this development according to the invention, the slewing motor can be mounted on the motor vehicle pre-finished and be connected to the prepared stabilizer halves. In this case, the torsion element is also protected against external influences.

The torsion element preferably has at least one spring element, in particular a molded piece which can be deformed in a spring-elastic fashion and which, while stressing the two stabilizer halves torsionally, is loaded by way of tension, compression, or torsion.

In one development according to the invention, the torsion element is provided on the one hand with a drive part of the drive of the slewing motor and on the other hand with a connecting part of the one stabilizer half, wherein a spring element for a spring-elastic relative rotation between the drive part and the connecting part is effectively arranged between the drive part and the connecting part. It is possible, for example, to connect compression springs between the drive part and the connecting part, which compression springs are supported on the one hand on bearing faces of the drive part and on the other hand on bearing faces of the connecting part.

The connecting part is preferably rotatably mounted on a motor housing of the stewing motor by means of a bearing, which is provided for transmitting tilting moments. In many cases, the motor housing is permanently connected to the one stabilizer half, for example by means of a screw connection or else also by means of a welded connection. On the other hand, the drive part can be permanently connected to the other stabilizer half. Under torsional loading it is possible to introduce transverse forces to the stabilizer, in which case, in this development according to the invention, the transverse forces are transmitted satisfactorily from the one stabilizer half to the other stabilizer half via the bearing which is proposed here. In particular, angular contact ball bearings in an O-arrangement are suitable for such bearings. In the case of O-arrangements, the compression medium points of the bearing are located at a large distance from one another on sides of the angular contact ball bearings which face away from one another, with the result that considerable tilting moments can be absorbed.

In one development according to the invention, the spring element is arranged radially inside the bearing, that is to say, for example, inside a bearing ring of the bearing. In the case of a bearing in an O-arrangement, the spring elements can also be accommodated axially inside this bearing, to be precise in particular inside the pressure medium points, with the result that it is ensured that the spring elements which are used here transmit exclusively torques between the two stabilizer halves but no transverse forces or tilting moments.

The connecting part and the drive part are preferably provided with webs which are arranged one behind the other on the circumference about a rotational axis, engage one in the other and can be embodied, in particular, as claws or lamellas. The spring elements are arranged between these webs which engage one in the other. In the case of slewing motors according to the invention, the rotational axis of the slewing motor may coincide with the rotational axis of the stabilizer.

The spring elements, which are embodied as molded pieces which can be deformed spring-elastically, may be arranged free of play in the circumferential directions between these webs which engage one in the other. For example, molded pieces made of elastomer material, for example rubber mixtures, may be used here. In such developments according to the invention, apart from the desired jump in rigidity, the noise path on the drive side of the slewing motor to the one stabilizer half, and therefore to the wheel support, is interrupted at the same time.

The pockets which are formed by the webs which engage one in the other and which have the purpose of accommodating the molded pieces which can be deformed spring-elastically can have deflection spaces for accommodating deformed material of the molded pieces. When, for example in the case of a rotation of the two stabilizer halves, two webs which engage one in the other approach one another, the molded piece which is located between them is deformed, wherein the deformed regions of the molded piece are displaced into the deflection spaces which are provided. In this form-changing work, these molded pieces become increasingly rigid, preferably progressively more rigid.

In one development according to the invention, these deflection spaces may be formed such that they are largely filled by the displaced areas of the molded pieces which are deformed spring-elastically. When the molded pieces are non-compressible, the connecting part and the drive part behave as a single rigid component when the deflection spaces are displaced during a further transmission of torque.

BRIEF DESCRIPTION OF THE DRAWINGS

The invention is explained in more detail below on the basis of an exemplary embodiment which is illustrated in a total of 7 figures, in which.

DETAILED DESCRIPTION OF THE INVENTION

Figure 1:
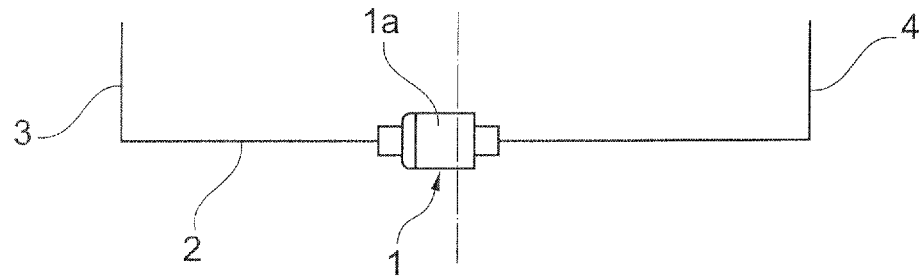
FIG. 1 shows a slewing motor according to the invention, integrated in a divided stabilizer.

FIG. 1 is a schematic illustration of an active rolling stabilizer having a slewing motor 1 according to the invention. The slewing motor 1 is connected to a divided stabilizer 2. The stabilizer 2 has two stabilizer halves 3, 4, wherein the one stabilizer half 3 is connected in a rotationally fixed fashion to a motor housing 1a on the stator side. The other stabilizer half 4 is introduced by its free end into the slewing motor 1 and connected to the drive (not illustrated here).

Figure 2:
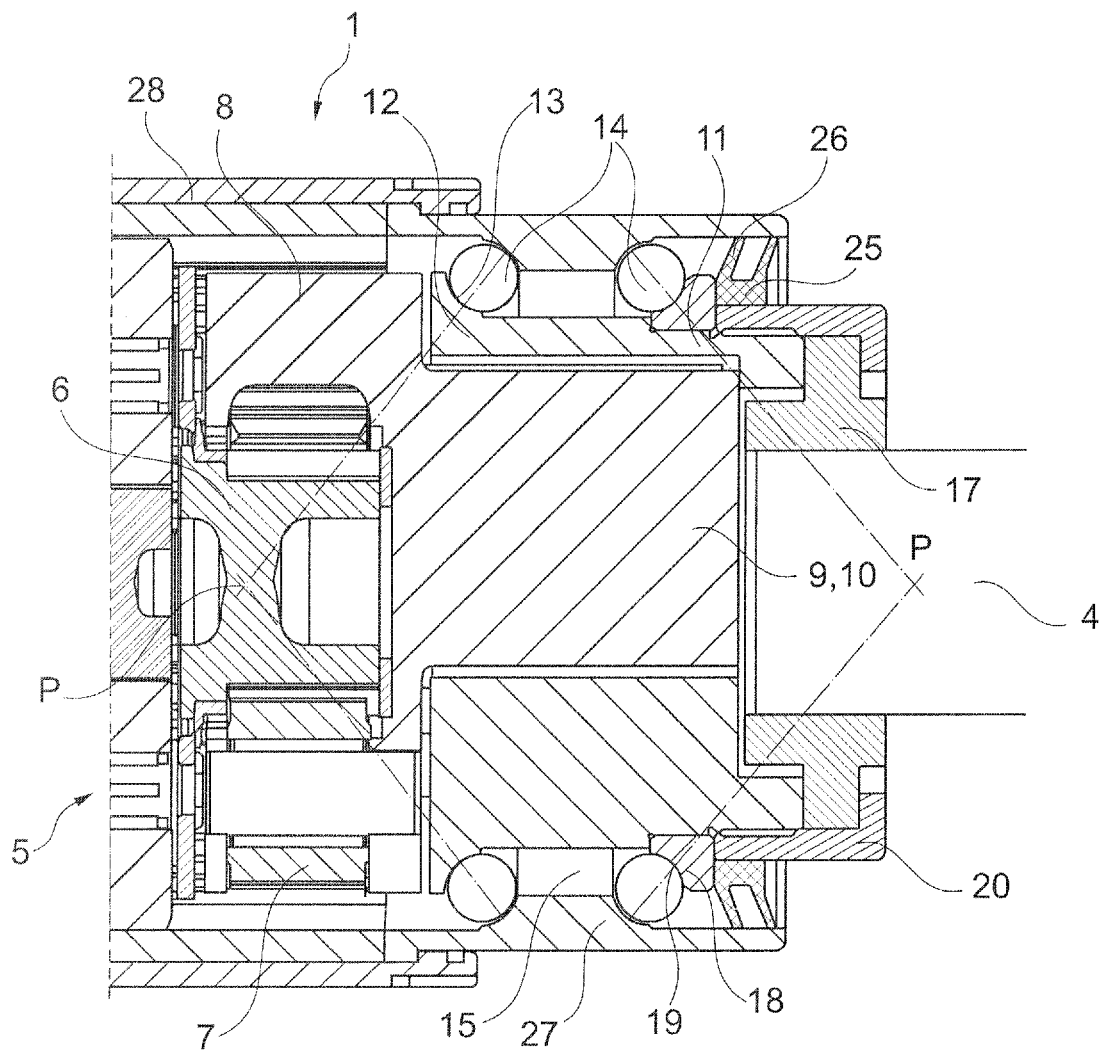
FIG. 2 shows the slewing motor from FIG. 1 in a longitudinal section.

FIG. 2 shows a longitudinal section of the slewing motor from FIG. 1, with a portion of a planetary gear mechanism 5 being illustrated on the drive of the slewing motor 1 here. A sun gear 6 meshes with planetary gears 7 which are rotatably mounted on a planetary carrier 8. A drive part 9 is integrally formed on the planetary carrier 8.

Figure 6:
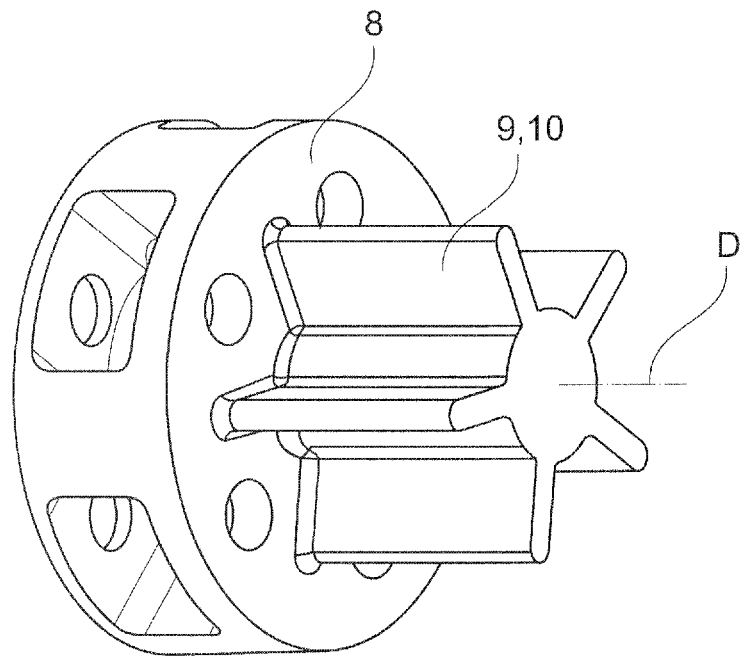
FIG. 6 shows a further individual part of the slewing motor according to the invention in a perspective illustration.

The planetary carrier 8 with the integrally formed-on drive part 9 is clearly illustrated in a perspective view in FIG. 6. It is apparent here that the drive part 9 is provided with a multiplicity of webs 10 which are arranged one behind the other in the circumferential direction about a rotational axis D. These webs 10 are arranged in a star shape about this rotational axis D. In an alternative embodiment, the planetary carrier 8 and the drive part 9 can also be separate parts which are, for example, welded to one another.

Figure 4:
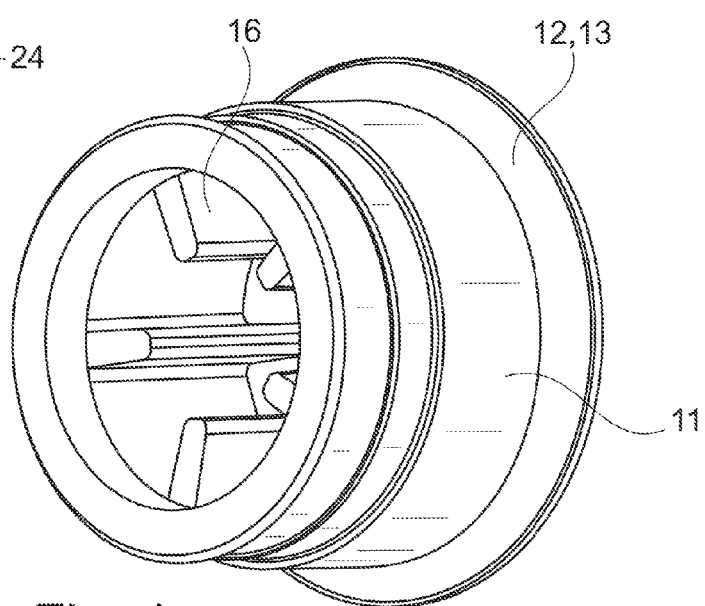
FIG. 4 shows an individual part of the slewing motor in a perspective illustration.

FIG. 2 also shows that the drive part 9 engages with its webs 10 in an annular connecting part 11. This connecting part 11 is illustrated in a perspective view in FIG. 4. The connecting part 11 is provided at an axial end with an integrally formed-on radial rim 12 which is provided with a ball groove 13 as a raceway for balls 14 of a two-row angular contact ball bearing 15.

Figure 3:
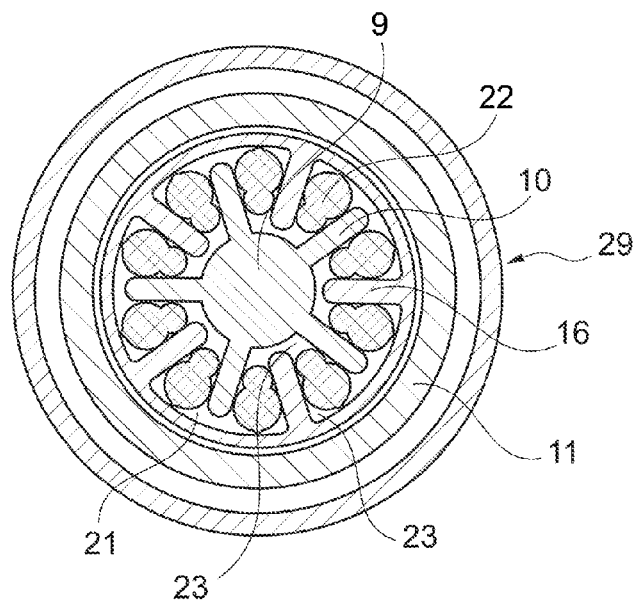
FIG. 3 shows the slewing motor in cross section.

The connecting part 11 which is embodied in an annular shape is provided on its internal circumference with a multiplicity of webs 16 which are arranged in the circumferential direction about a rotational axis, wherein the webs 16 of the connecting part 11 and the webs 10 of the drive part 9 engage one in the other, as is shown in FIG. 3.

FIG. 2 also shows that the connecting part 11 is permanently connected to the stabilizer half 4 of the stabilizer 2 via a sleeve 17.

A bearing ring 18 of the angular contact ball bearing 15 is arranged on the outer circumference of the connecting part 11 which is formed in an annular shape, which angular bearing ring 18 is also provided with a ball groove 19 for the balls 14 to roll in. The bearing ring 18 can be positioned by means of a clamping sheath 20, which is screwed to the connecting part 11 for setting bearing play of this two-row angular contact ball bearing 15.

FIG. 3 shows that the webs 10, 16 engaging one in the other, of the drive part 9 and of the connecting part 11 delimit pockets 21 in which molded pieces 22, which can be deformed spring-elastically, are arranged without play in the circumferential directions. Each of the molded pieces 22 bears on the one hand on one of the webs 10 of the drive part 9 and on the other hand on one of the adjacent webs 16 of the connecting part 11. In the present case, these molded pieces 22 are formed from an elastomer material, which may be virtually non-compressible.

FIG. 3 shows that the pockets 21 are made larger than the molded pieces 22, with the result that deflection spaces 23 are formed. Given a relative rotation of the drive part 9 and of the connecting part 11 with respect to one another, every second pocket 21 is reduced in size because the adjacent webs 10, 16 approach one another. When this relative movement occurs, the molded pieces 22 in the pockets 21, which become smaller in size, are deformed. Deformed sections of these molded pieces 22 are forced into these deflection spaces 23. The molded pieces 22 form compression springs.

If these molded pieces 22 are elastically deformable, but non-compressible, a further relative rotation between the drive part 9 and the connecting part 11 is ruled out when the deflection spaces 23 are filled; only a common rotational movement of the connecting part 11 and the drive part 9 can now occur in this rotational sense. In this situation, the connecting part 11 and the drive part 9 behave as a single rigid component. Further rotation then occurs only between the two stabilizer halves 3, 4 as a function of the rotational rigidity of the stabilizer 2.

The drive part 9 and the connecting part 11 form, together with the molded pieces 23 which can be deformed spring-elastically, a torsion element 29. This torsion element 29 is arranged radially inside the angular contact ball bearing 15. FIG. 2 also shows that this torsion element 29 is arranged axially between the two pressure points P of the angular contact ball bearing 15. The number of pockets and, accordingly, also the number of webs and molded pieces as well as the shape of the pockets and molded pieces may vary and are to be adapted to the respective rolling stabilizer.

Figure 5:
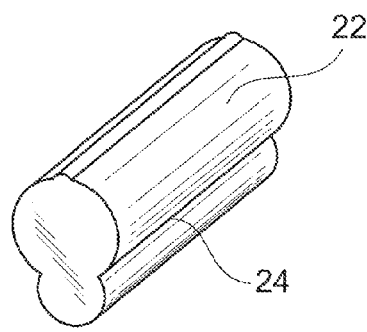
FIG. 5 shows a further individual part of the slewing motor in a perspective illustration.

FIG. 5 shows one of the molded pieces 22 in a perspective view. The contour of the molded piece 22 is adapted to the geometry of the pockets 21. This molded piece 22 has constricted sections 24, which are also available as deflection space for accommodating displaced material of the molded piece 22.

Figure 7:
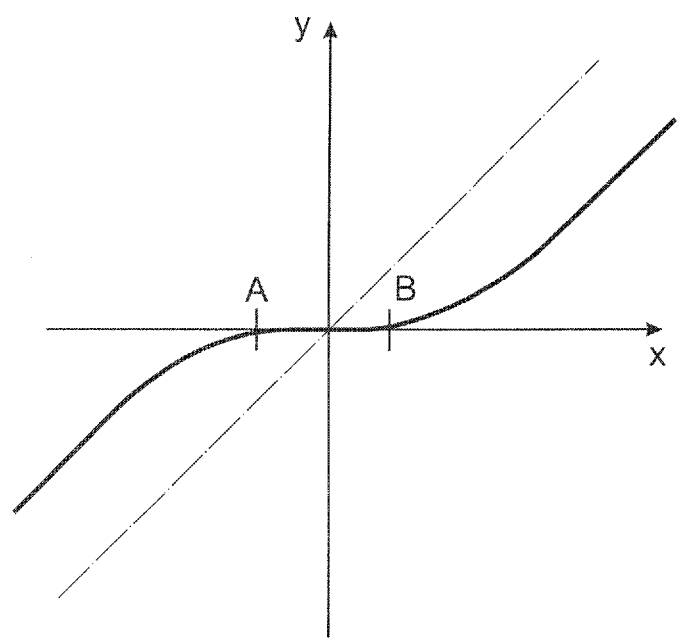
FIG. 7 shows the characteristic curve of the rotational rigidity of an active rolling stabilizer with a slewing motor according to the invention.

FIG. 7 shows schematically the rigidity behavior of an active rolling stabilizer with a slewing motor according to the invention. The torque (ordinate) is plotted here against the rotational angle (abscissa). That torque, which is transmitted via the stabilizer 2, is denoted here. This figure shows that this active rolling stabilizer has a high degree of elasticity at low torque values. This section is characterized in the diagram by the points A and B. Within this section, relative movements between the drive part 9 and the connecting part 11 are possible by deforming the molded pieces 22 without transmitting appreciable torques.

FIG. 7 also shows that the transmitting torques increase progressively outside this section A-B. The molded pieces 22 and the pockets 21 are embodied in such a way that, although the molded pieces 22 are still increasingly deformed in the progressive sections of the characteristic curve, this is, however, accompanied by a progressive increase in the rigidity of the torsion element 29.

The slewing motor 1 according to the invention encloses the torsion element 29 completely, with the result that foreign materials cannot penetrate the region of the pockets 21 and of the molded pieces 22 and also cannot penetrate the region of the angular contact ball bearing 15. In order to provide an efficient seal of the angular contact ball bearing 15, a multi-lip sealing ring, which is spring-mounted with its sealing lips 26 against the internal circumference of an outer ring 27 of the angular contact ball bearing 15, is arranged on the outer circumference of the clamping sheath 20 here. The outer ring 27 is in turn attached to the motor housing 1a of the slewing motor 1.

The fact that the connecting part 11 is mounted in a non-tilting fashion with respect to the motor housing 1a by means of the multi-row angular contact ball bearing 15 ensures that no bending moments or transverse forces are transmitted between the connecting part 11 and the drive part 9.

A noise path is advantageously interrupted by interposing the molded pieces 22, formed from an elastomer material, between the planetary gear mechanism 5 and the stabilizer half 4.

In the case of the slewing motor 1 according to the invention, a rigid connection of the slewing motor 1 to the one stabilizer half 4 has been eliminated in favor of an initially torsion-elastic connection. The initially torsion-elastic rigidity behavior of the active roll stabilizer is advantageously apparent here, in particular in the case of straight-ahead travel with one-sided springing movement, in particular in the case of springing movement caused by obstacles. The advantages that the invention aims to achieve are apparent particularly at low amplitudes and high frequencies.

Slewing motors according to the invention can have an electric drive or else a hydraulic drive. In contrast to the exemplary embodiment, the torsion element in variants according to the invention, can be arranged outside the motor housing and, if appropriate, can be embodied in an encapsulated form.

In the exemplary embodiment, positively locking stops, which are effective between the webs, may additionally be provided with the result that starting from a predetermined rotational angle between the drive part and the connecting part no further rotation is possible between these parts.

LIST OF REFERENCE NUMERALS

1 Slewing motor
1a Motor housing
2 Divided stabilizer
3 Stabilizer half
4 Stabilizer half
5 Planetary gear mechanism
6 Sun gear
7 Planet gear
8 Planet carrier
9 Drive part
10 Web
11 Connecting part
12 Radial rim
13 Ball groove
14 Ball
15 Angular contact ball bearing
16 Web
17 Sleeve
18 Bearing ring
19 Ball groove
20 Clamping sheath
21 Pocket
22 Molded piece
23 Deflection space
24 Constricted section
25 Sealing ring
26 Sealing lip
27 Outer ring
28
29 Torsion element

The invention claimed is:

1. An active roll stabilizer with a slewing motor, which can be connected by a drive to one stabilizer half, and which can be connected on a stator side to another stabilizer half of a divided stabilizer,
    wherein a torsion element, which has a rotational rigidity that is lower than the rotational rigidity of the stabilizer, is arranged between the drive and the one stabilizer half,
    wherein the torsion element has a drive part, which is connected to the drive and a connecting part, which can be connected to the one stabilizer half,
    wherein a spring element is effectively arranged between the drive part and the connecting part, for spring-elastic relative rotation between the drive part and the connecting part,
    wherein the connecting part is rotatably mounted on a motor housing of the slewing motor by a bearing which is provided for transmitting tilting moments, and
    wherein the slewing motor is arranged such that rotation of the drive of the slewing motor is transmitted to the one stabilizer half through the drive part, the spring element, and the connecting part.

2. The active roll stabilizer of claim 1, wherein the torsion element is accommodated inside a motor housing of the slewing motor.

3. The active roll stabilizer of claim 1, wherein the bearing has angular contact ball bearings in an O-arrangement.

4. The active roll stabilizer of claim 1, wherein the spring element is accommodated radially inside the bearing.

5. An active roll stabilizer with a slewing motor, which can be connected by a drive to one stabilizer half, and which can be connected on a stator side to another stabilizer half of a divided stabilizer,
- wherein a torsion element, which has a rotational rigidity that is lower than the rotational rigidity of the stabilizer, is arranged between the drive and the one stabilizer half,
- wherein the torsion element has a drive part, which is connected to the drive and a connecting part, which can be connected to the one stabilizer half,
- wherein a spring element is effectively arranged between the drive part and the connecting part, for spring-elastic relative rotation between the drive part and the connecting part,
- wherein the connecting part if rotatably mounted on a motor housing of the slewing motor by a bearing which is provided for transmitting tilting moments, and
- wherein the connecting part and the drive part are provided with webs, which are arranged one behind the other and engage one in the other on a circumference about a rotational axis, wherein the spring elements are arranged between webs which engage one in the other.

6. The active roll stabilizer of claim 5, wherein the spring elements, which are embodied as molded pieces, which can be deformed spring-elastically, are arranged free of play in circumferential directions between the webs, which engage one in the other.

7. The active roll stabilizer of claim 6, wherein the pockets, which are formed by the webs, which engage one in the other, have deflection spaces for accommodating material of the molded pieces which is deformed spring-elastically.

8. The active roll stabilizer of claim 1, wherein the spring element is a molded piece.

9. The active roll stabilizer of claim 5, wherein the webs are claws or lamellas.

10. The active roll stabilizer of claim 1, wherein the spring element is deformed in a spring-elastic manner and is loaded under torsion.

11. The active roll stabilizer of claim 5, wherein the slewing motor is arranged such that rotation of the drive of the slewing motor is transmitted to the one stabilizer half through the drive part, the spring element, and the connecting part.

* * * * *